(12) United States Patent
Aceves

(10) Patent No.: US 6,554,174 B1
(45) Date of Patent: Apr. 29, 2003

(54) INTEGRATED ELECTRONICS WORKSTATION

(76) Inventor: Manuel Aceves, 613 Arcadia Ter., Apartment 203 Sunnyvale, CA (US) 94086

( * ) Notice: Subject to any disclaimer, the term of this patent is extended or adjusted under 35 U.S.C. 154(b) by 0 days.

(21) Appl. No.: 10/011,628

(22) Filed: Dec. 5, 2001

(51) Int. Cl.[7] .............................................. B23K 37/04
(52) U.S. Cl. ...................................... 228/49.5; 228/51
(58) Field of Search .............................. 228/44.3, 44.7, 228/49.1, 47.1, 49.5, 51

(56) References Cited

U.S. PATENT DOCUMENTS

| 3,604,611 | A | * | 9/1971 | Lamberty ..................... 228/36 |
| 3,940,046 | A | * | 2/1976 | Fern ................................ 228/8 |
| 4,163,142 | A | * | 7/1979 | Descovich et al. ........... 219/79 |
| 4,817,851 | A | * | 4/1989 | Kolesar et al. ............. 228/119 |
| 4,846,390 | A | * | 7/1989 | Masuda et al. ............ 228/49.5 |
| 4,910,859 | A | * | 3/1990 | Holcomb ................... 29/564.2 |
| 4,947,980 | A | * | 8/1990 | Helmstetter ............. 198/345.3 |
| 5,048,742 | A | * | 9/1991 | Fortune ...................... 228/20.5 |
| 5,240,746 | A | * | 8/1993 | O'Connell Litteral ...... 427/510 |
| 5,261,590 | A | * | 11/1993 | Tsai .............................. 228/41 |
| 5,639,011 | A | * | 6/1997 | Jacks et al. ............ 228/180.21 |
| 5,826,779 | A | * | 10/1998 | Jacks et al. .................... 228/42 |
| 5,915,749 | A | * | 6/1999 | Baldwin ....................... 29/593 |
| 5,941,444 | A | * | 8/1999 | Sadler et al. ................. 228/33 |
| 6,092,713 | A | * | 7/2000 | Kim ....................... 228/180.21 |
| 6,186,388 | B1 | * | 2/2001 | Sadler et al. ................. 228/37 |
| 6,201,930 | B1 | * | 3/2001 | Close et al. ................ 392/379 |

* cited by examiner

Primary Examiner—Tom Dunn
Assistant Examiner—Kiley Stoner
(74) Attorney, Agent, or Firm—Steins & Associates, P.C.

(57) ABSTRACT

An Integrated Electronics Workstation is disclosed. Also disclosed is a workstation that includes a housing with an integrated exhaust fan. The workstation further includes a plurality of other features, including a pair of adjustable arms and board grips mounted thereto for holding boards and/or wire while the board is being worked on. Still further, the workstation includes a soldering tool station, one or more wire spools, a light housing for illuminating the work area, a voltage measuring device, a power supply device, and a microscope and/or loupe.

20 Claims, 4 Drawing Sheets

INTEGRATED ELECTRONICS WORKSTATION

BACKGROUND OF THE INVENTION

1. Field of the Invention

This invention relates generally to electronics benches and, more specifically, to an Integrated Electronics Workstation

2. Description of Related Art

The conception, design, creation and testing and repair of circuit board assemblies requires a variety of tools, fixtures and materials that are rarely found in a single, convenient location. As a result, the test engineer must typically collect these devices from the worldwide collection of equipment, and then figure out a way to keep them organized while doing constructive work. What is needed is an integrated workstation that provides all of the necessary tools, fixtures and materials necessary to build, test and repair circuits in one convenient package that will, maintain its organizational integrity by default.

SUMMARY OF THE INVENTION

In light of the aforementioned problems associated with the prior devices and systems, it is an object of the present invention to provide an Integrated Electronics Workstation. The workstation should include a housing with an integrated exhaust fan. It is an object that the workstation further include a plurality of other features, including a pair of adjustable arms and board grips mounted thereto for holding boards and/or wire while the board is being worked on. The workstation should further include a soldering tool station, one or more wire spools, a light housing for illuminating the work area, a voltage measuring device, a power supply device, and a microscope and/or loupe.

BRIEF DESCRIPTION OF THE DRAWINGS

The objects and features of the present invention, which are believed to be novel, are set forth with particularity in the appended claims. The present invention, both as to its organization and manner of operation, together with further objects and advantages, may best be understood by reference to the following description, taken in connection with the accompanying drawings, of which:

DETAILED DESCRIPTION OF THE PREFERRED EMBODIMENTS

The following description is provided to enable any person skilled in the art to make and use the invention and sets forth the best modes contemplated by the inventor of carrying out his invention. Various modifications, however, will remain readily apparent to those skilled in the art, since the generic principles of the present invention have been defined herein specifically to provide an Integrated Electronics Workstation.

Figure 1:
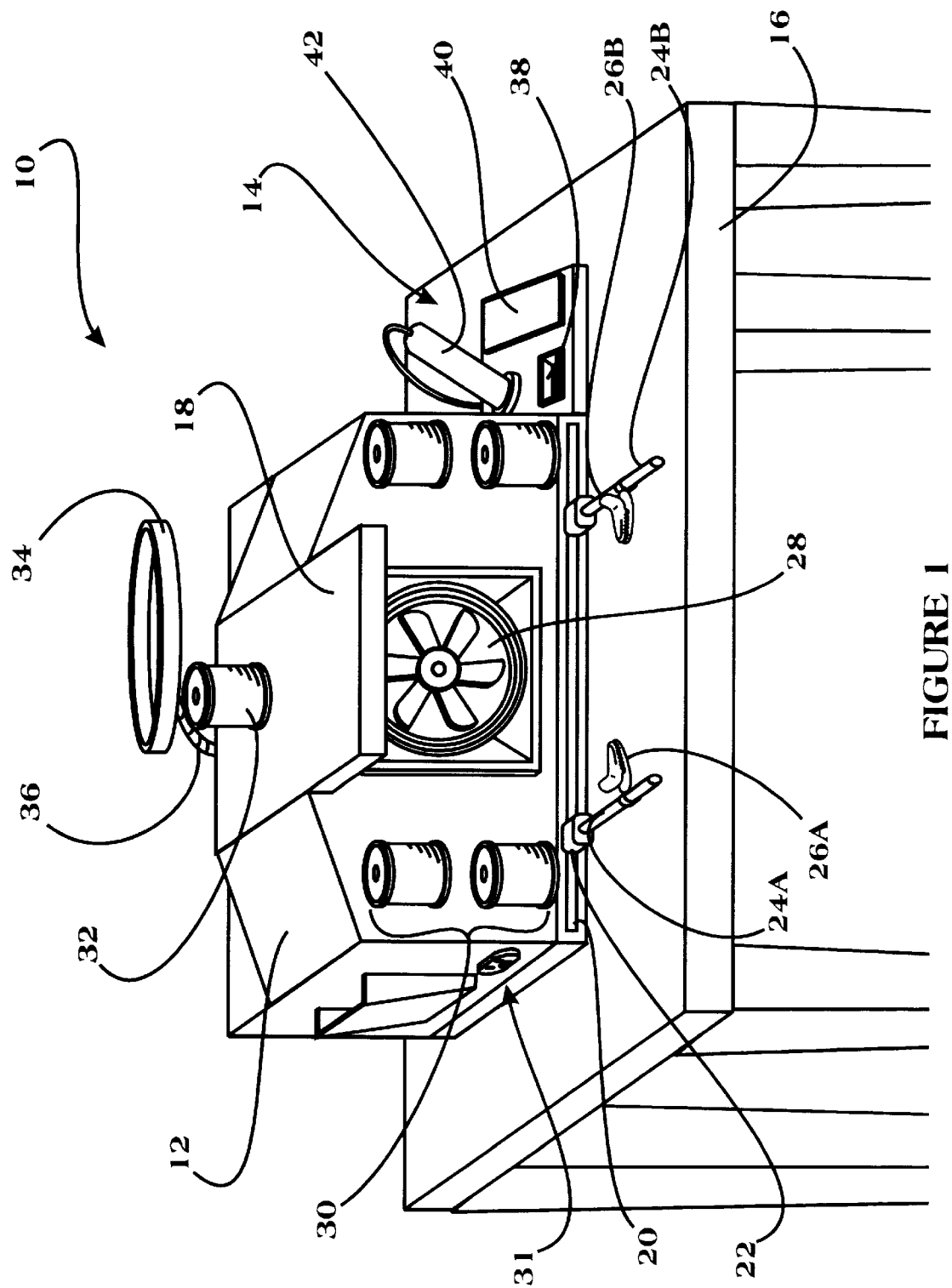
FIG. 1 is a perspective view of one embodiment of the integrated electronics workstation of the present invention.

The present invention can best be understood by initial consideration of FIG. 1. FIG. 1 is a perspective view of one embodiment of the integrated electronics workstation 12 of the present invention. As shown here, the workstation 12 comprises a housing 14 adjacent (and possibly attached thereto) to which is a soldering tool station 14. The housing 12 and station 14 are configured to rest upon a flat surface, such as the table 16 shown here.

In its preferred form, the workstation 10 will include a track 20 along the bottom of its front face. The track 20 is configured to accept one or more arm shuttles 22 therein. Each arm shuttle 22 is designed to be slid along the track 20 and then fixed in a desired location along the track 20. Extendable from each arm shuttle 22 is an arm, depicted here as first arm 24A and second arm 24B. The facing sides of each arm 24 are defined by slots formed therein for accepting a circuit board therein. On the top of each arm 24 is preferably extending a wire/cable grip 26, of a design such as the "alligator clips" shown in this FIG. 1. In use, the shuttles 22 are positioned so that the arms 24 are of the desired distance apart such that a circuit board (not shown) is held between the arms 24 (i.e. in the slots formed on the facing sides of the arms 24). At the same time, wires and/or cables can be could then be grasped at each end by the grips 26; in this manner, the circuit board (not shown) and wires/cables will be held in a stable, convenient location and position such that it can be easily worked upon. On the left-hand side of the housing 12 (in this view), are found a tool pocket 44 (described further below), and one or more AC power output jacks 31.

In order to provide adequate lighting for the work area, a light is provided within a light housing 18 extending from the upper front face of the housing 12. Furthermore, in order to clear fumes from combustion (such as from soldering), an exhaust fan 28 is preferably operable within the housing 18, adjacent to the work area. In this embodiment, a solder spool 32 has been provided atop the housing 12, such that it will be conveniently within reach for soldering. Similarly, a plurality of wire spools 30 may be disbursed across the face of the housing 12 so that different gauges and/or types of wire will be close at hand. Extending from the rear of the wire might be a loupe arm 36, such as the flexible design shown; at its end, would be found a loupe 34. The arm 36 will be configured such that the loupe 34 might be positioned over the front of the housing 12, between the user's face and the circuit board being held by the grips 26.

In addition to the aforementioned components associated with the main housing 12 (and others that will be described below in connection with the remaining drawing figures), the workstation 10 will preferably also include a soldering tool station 14. The station 14 has an upwardly-tilted face with at least three features disbursed thereon. First, a soldering iron 42 will be held therein for easy access. Next, a sponge 40 (or other similar cooling station) will be provided for safely taking away heat from workpieces and/or solder tips. Still further, a tip reservoir 38 will be provided so that additional soldering iron tips might be stored for convenient access and replacement. If we now turn to FIG. 2, we can examine additional features of the workstation 10 of the present invention.

Figure 2:
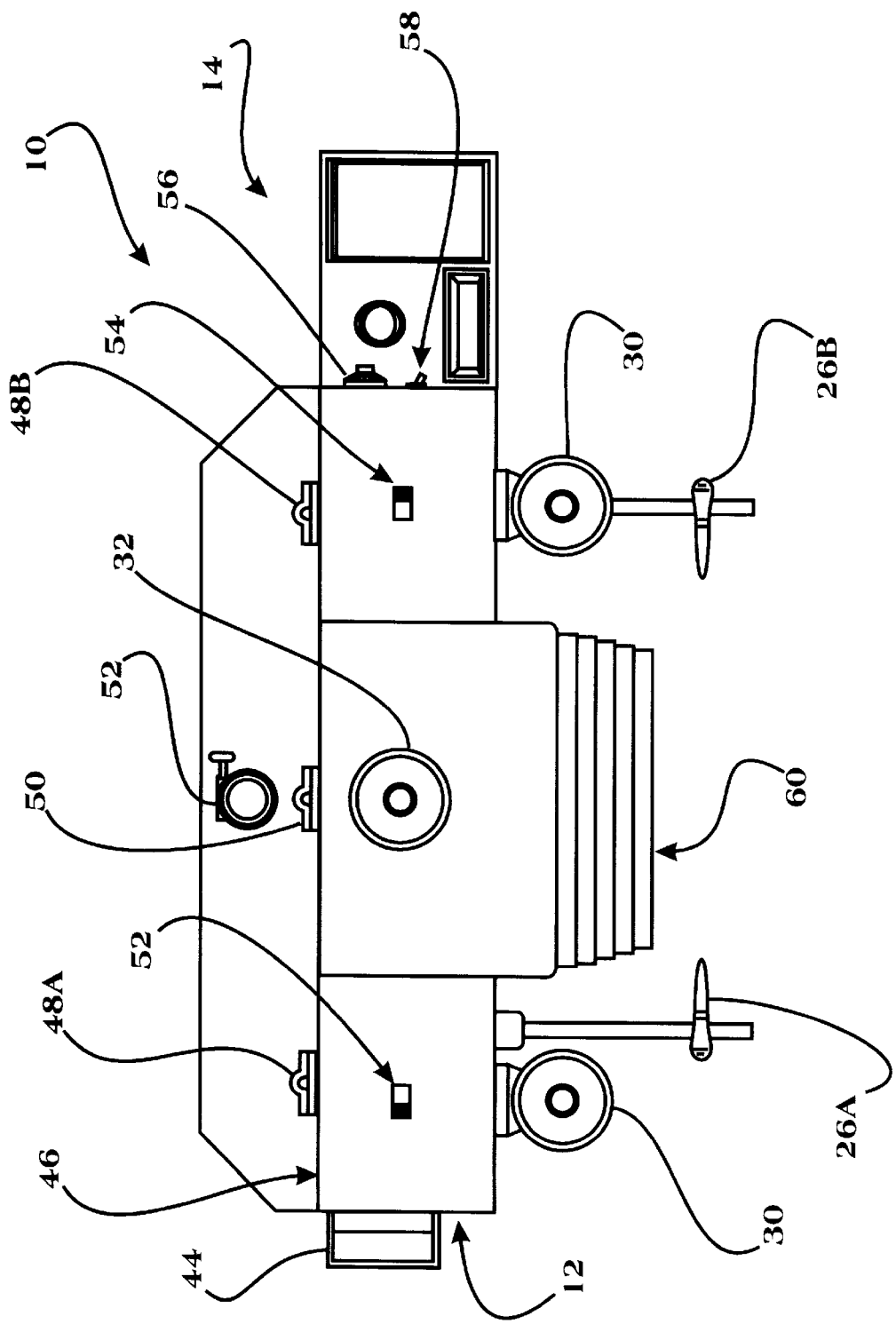
FIG. 2 is a top view of the embodiment of FIG. 1.

FIG. 2 is a top view of the embodiment 10 of FIG. 1. As shown here, the housing 12 might further be defined by a rear deck 46. Disbursed across the rear deck 46 are several brackets for mounting lights as well as the aforementioned loupe (see FIG. 1); namely, one or more light arm brackets 48A and 48B, as well as a loupe arm bracket 50. In fairly close proximity to the rear deck 46, but on the rear portion of the top surface of the housing 12 is preferably located a microscope arm bracket 52. The microscope arm bracket 52 is provided such that a conventional or electronic microscope might be removeably mounted therein in instances where the loupe (see FIG. 1) will not provide sufficient focusing strength.

Extending from the side of the housing 12 is preferably a tool pocket 44, such as the rectangular holder shown here (and depicted in later drawing figures); the pocket 44 can be used to provide a convenient location for other miscellaneous tools, such as screwdrivers, pliers and other devices. In the vicinity of the soldering tool station 14, and extending from the housing 12 are a soldering iron temperature control 56 and soldering iron power switch 58. Also, one or more switches for lights 52 and the exhaust fan 54 will be provided on the housing 12 for easy access and operation of the respective components. Another feature shown here is the fume extraction hose 60; this hose or duct 60 is preferably a retractable duct that can be extended forward from the face of the exhaust fan (see FIG. 1) such that the vicinity of the work area (i.e. where the circuit board is being held by the grips 26) can be even more thoroughly and specifically exhausted, if desired. We shall now turn to FIG. 3 in order to examine additional features of this new workstation 10.

Figure 3:
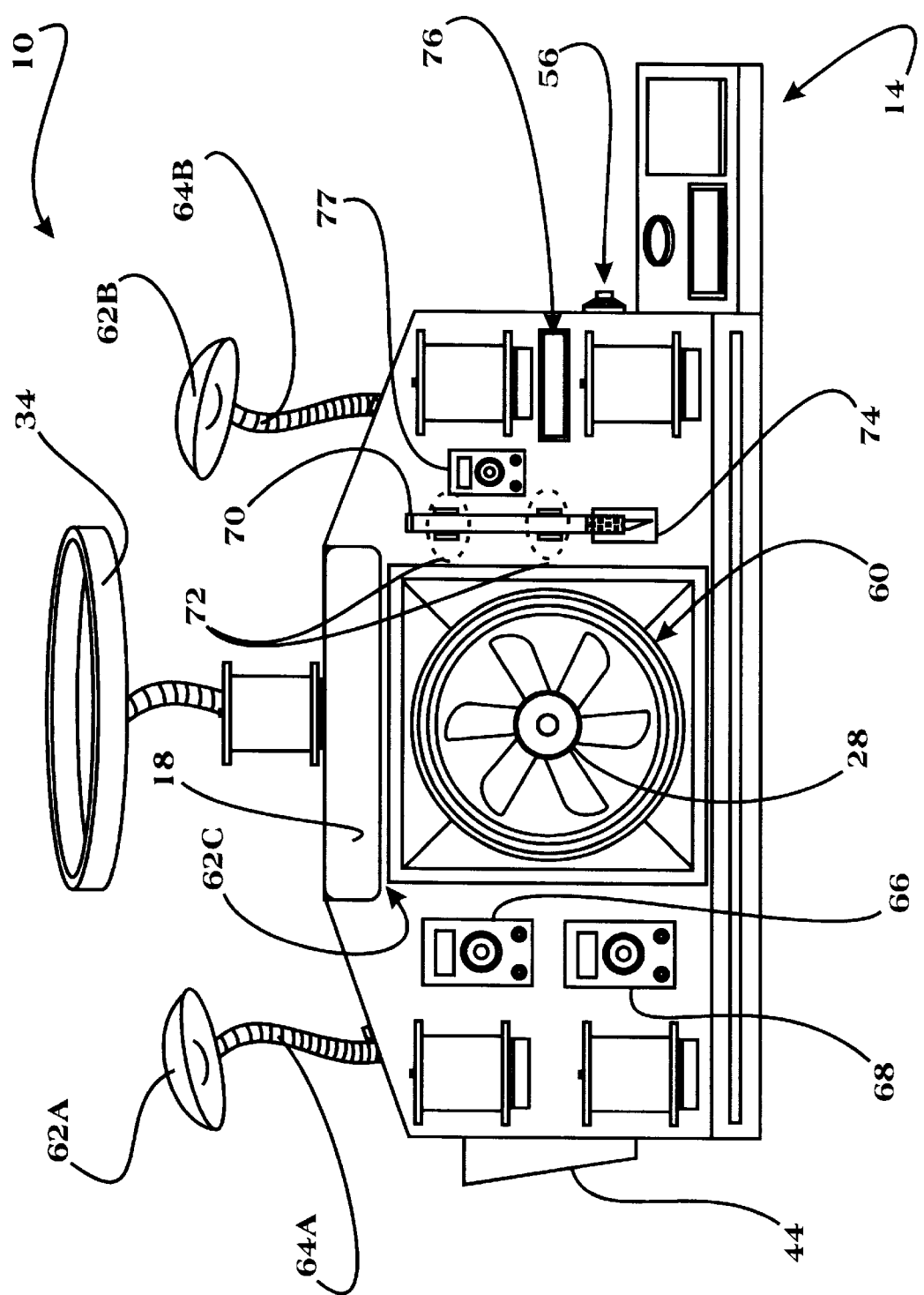
FIG. 3 is a front view of the embodiment of FIGS. 1 and 2.

FIG. 3 is a front view of the embodiment 10 of FIGS. 1 and 2. As shown here, the lights 62A and 62B each extend from a flexible light arm, 64A and 64B respectively, these arms 64 enable the user to position the lights 64A and 64B in unlimited configurations to provide very comprehensive lighting to the work area. Furthermore, a stationary light 62C is provided on the underside of the light housing 18.

Of particular interest in this depiction are several devices, namely a voltage measuring device 66 (or multimeter) and power supply 68 disbursed on the front face of the housing 12. Also found on the housing face are a temperature display 76 for displaying the current temperature of the soldering iron (see FIG. 1), and/or a function/signal generator device 77. Adjacent to the exhaust fan 28 is a knife 70. The knife 70 is held in position by one or more cooperating clips 72 that permit the user to easily pull the knife 70 from its position when needed. For additional safety during stowage, a blade cup 74 is provided that acts as a sheath for the blade of the knife 70. Still further, one or more antistatic buttons might be disbursed on the housing 12. Certainly, each of these features and/or devices might be located at different positions on the housing 12 in order to provide the most utility for a particular user.

Figure 4:
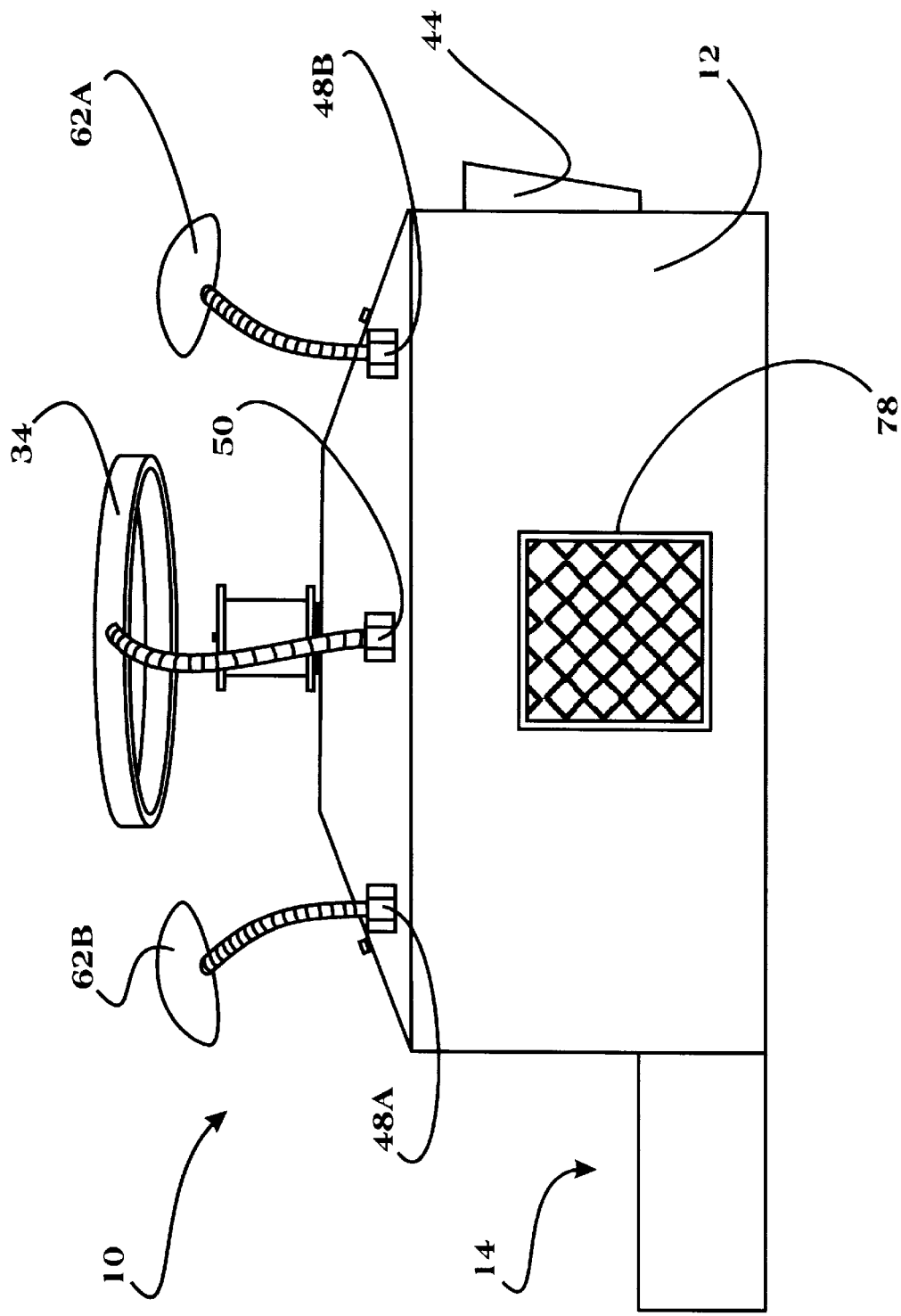
FIG. 4 is a back view of the embodiment of FIGS. 1–3.

Finally, we will turn to FIG. 4 to examine another feature of the present invention. FIG. 4 is a back view of the embodiment 10 of FIGS. 1–3. As shown here, the exhaust fan (see FIGS. 1 and 3) will have an exhaust aperture or duct connection port 78 such that the effluent from the exhaust fan (see FIGS. 1 and 3) can be taken out of the area by some external venting system. While this embodiment includes the port 78 centered on the back surface of the housing 12, it should be understood that the port 78 might also be located on another surface of the housing 12 in order to provide additional utility for a particular installation.

Those skilled in the art will appreciate that various adaptations and modifications of the just-described preferred embodiment can be configured without departing from the scope and spirit of the invention. Therefore, it is to be understood that, within the scope of the appended claims, the invention may be practiced other than as specifically described herein.

What is claimed is:

1. An integrated electronics workstation, comprising:
    a housing, said housing comprising a right, left, front, back, top and bottom sides, said housing further defining an interior chamber;
    an exhaust fan protruding through an aperture formed in said front side;
    a track;
    at least one arm shuttle attachable to said track;
    at least one arm each said arm extending from each said arm shuttle and terminating in a distal end;
    at least one board grip attached to said distal end; and
    a soldering tool station extending from said housing.

2. The workstation of claim 1, further comprising a pair of arm shuttles attachable to said track;
    one said arm extending from each said arm shuttle; and
    one said board grip attached to each said distal end.

3. The workstation of claim 2, further comprising:
    a light housing extending from said top side adjacent to said exhaust fan; and
    at least one wire spool attached to said front side.

4. The workstation of claim 3, further comprising:
    a voltage measuring device attached to said front side; and
    a blade cup attached to said front side.

5. The workstation of claim 4, further comprising:
    a power supply device attached to said front side; and
    a soldering iron temperature display positioned on said front side.

6. The workstation of claim 5, further comprising:
    at least one light arm extending generally upwardly from said housing and terminating in a distal end;
    at least one light at said light arm distal end.

7. The workstation of claim 6, further comprising:
    a fume extraction hose extendable from said exhaust fan in a direction away from said front side.

8. The workstation of claim 7, further comprising at least one solder spool extending upwardly from said housing.

9. The workstation of claim 8, further comprising:
    a loupe arm extending upwardly from said housing and terminating in a distal end.

10. The workstation of claim 9, further comprising a loupe attached to said distal end of said loupe arm.

11. The workstation of claim 8, further comprising a microscope arm extending upwardly from said housing and terminating in a distal end.

12. The workstation of claim 11, further comprising a microscope attached to said distal end of said microscope arm.

13. An electronics workstation combination, the combination comprising:
    a housing, said housing comprising a right, left, front, back, top and bottom sides, said housing further defining an interior chamber;
    an exhaust fan protruding through an aperture formed in said front side;
    a track;
    at least one arm shuttle attachable to said track;
    at least one arm each said arm extending from each said arm shuttle and terminating in a distal end;
    a blade cup attached to said front side;
    at least one light arm extending generally upwardly from said housing and terminating in a distal end;
    at least one light at said light arm distal end;
    at least one board grip attached to said distal end; and
    a soldering tool station extending from said housing.

14. The combination of claim 13, further comprising:
    a fume extraction hose extendable from said exhaust fan in a direction away from said front side.

15. The combination of claim 14, further comprising:

a loupe arm extending upwardly from said housing and terminating in a distal end; and a loupe attached to said distal end of said loupe arm.

16. A workstation for placement on a table, bench or cart, comprising:

a housing, said housing comprising a right, left, front, back, top and bottom sides, said housing further defining an interior chamber;

an exhaust fan protruding through an aperture formed in said front side;

a track;

at least one arm shuttle attachable to said track;

at least one arm each said arm extending from each said arm shuttle and terminating in a distal end;

at least one board grip attached to said distal end;

a soldering tool station extending from said housing; and a flat said bottom for resting on a table bench or cart.

17. The workstation of claim 16, further comprising a pair of arm shuttles attachable to said track;

one said arm extending from each said arm shuttle; and one said board grip attached to each said distal end, each said board grip comprising an alligator clip.

18. The workstation of claim 17, further comprising:

a voltage measuring device attached to said front side; and a blade cup attached to said front side.

19. The workstation of claim 18, further comprising:

a power supply device attached to said front side;

at least one light arm extending generally upwardly from said housing and terminating in a distal end;

at least one light at said light arm distal end.

20. The workstation of claim 19, further comprising:

a fume extraction hose extendable from said exhaust fan in a direction away from said front side; and a signal/function generator extending from said housing.

* * * * *